(12) United States Patent
Kirschner

(10) Patent No.: US 6,824,495 B1
(45) Date of Patent: Nov. 30, 2004

(54) PLANETARY GEAR FOR MOUNTING ON AN ELECTROMOTOR

(75) Inventor: Tino Kirschner, Eriskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/089,732

(22) PCT Filed: Nov. 21, 2000

(86) PCT No.: PCT/EP00/11582

§ 371 (c)(1),
(2), (4) Date: Apr. 3, 2002

(87) PCT Pub. No.: WO01/38759

PCT Pub. Date: May 31, 2001

(30) Foreign Application Priority Data

Nov. 25, 1999 (DE) .......................... 199 56 789

(51) Int. Cl.$^7$ ............................................. F16H 57/08
(52) U.S. Cl. ....................................... 475/348; 475/331
(58) Field of Search ................................ 475/149, 331, 475/348

(56) References Cited

U.S. PATENT DOCUMENTS

| | | | | |
|---|---|---|---|---|
| 3,315,547 A | * | 4/1967 | Fritsch .................... | 475/348 X |
| 3,958,465 A | * | 5/1976 | Hiersig et al. ................. | 475/1 |
| 4,983,152 A | | 1/1991 | Kimberlin et al. .......... | 475/331 |
| 4,991,473 A | * | 2/1991 | Gotman .................. | 475/259 X |
| 5,336,136 A | * | 8/1994 | Jacqui ..................... | 475/331 X |
| 5,649,879 A | * | 7/1997 | Kusumoto et al. .......... | 475/331 |
| 5,863,272 A | * | 1/1999 | Anderson ..................... | 475/331 |
| 6,129,648 A | * | 10/2000 | Tanioka et al. .............. | 475/331 |

FOREIGN PATENT DOCUMENTS

| | | | |
|---|---|---|---|
| DE | 42 01 373 A1 | 8/1992 | .......... H02K/7/116 |
| DE | 42 41 550 A1 | 6/1994 | .......... F16H/1/28 |
| DE | 196 47 063 A1 | 5/1998 | .......... F16D/3/118 |
| DE | 693 22 991 T2 | 5/1999 | .......... F16H/57/02 |
| DE | 198 08 184 C1 | 8/1999 | .......... H02K/7/116 |
| DE | 198 21 813 C1 | 1/2000 | .......... F16H/57/08 |
| EP | 0 428 824 A2 | 5/1991 | .......... F16H/37/04 |
| EP | 0 567 048 A1 | 10/1993 | |
| EP | 0 687 836 A1 | 12/1995 | .......... F16H/57/02 |
| EP | 1 048 877 A1 | 11/2000 | .......... F16H/1/16 |
| GB | 2 252 137 A | 7/1992 | .......... F16J/15/02 |
| JP | 401203738 | * 2/1988 | .................. 475/331 |
| JP | 10112952 | 4/1998 | .......... H02K/5/10 |

* cited by examiner

Primary Examiner—Ha Ho
(74) Attorney, Agent, or Firm—Davis & Bujold, P.L.L.C.

(57) ABSTRACT

A planetary gear for mounting on an electromotor is proposed, in which higher efficiency is achieved by positioning a sealing element (22) between a housing (2) and a sun gear shaft (4) on the input side, axially outside a receiving area (16) for the output shaft of the electric motor, in an axial section of the sun gear shaft (4) with an outer reduced diameter compared to the receiving area (16).

12 Claims, 1 Drawing Sheet

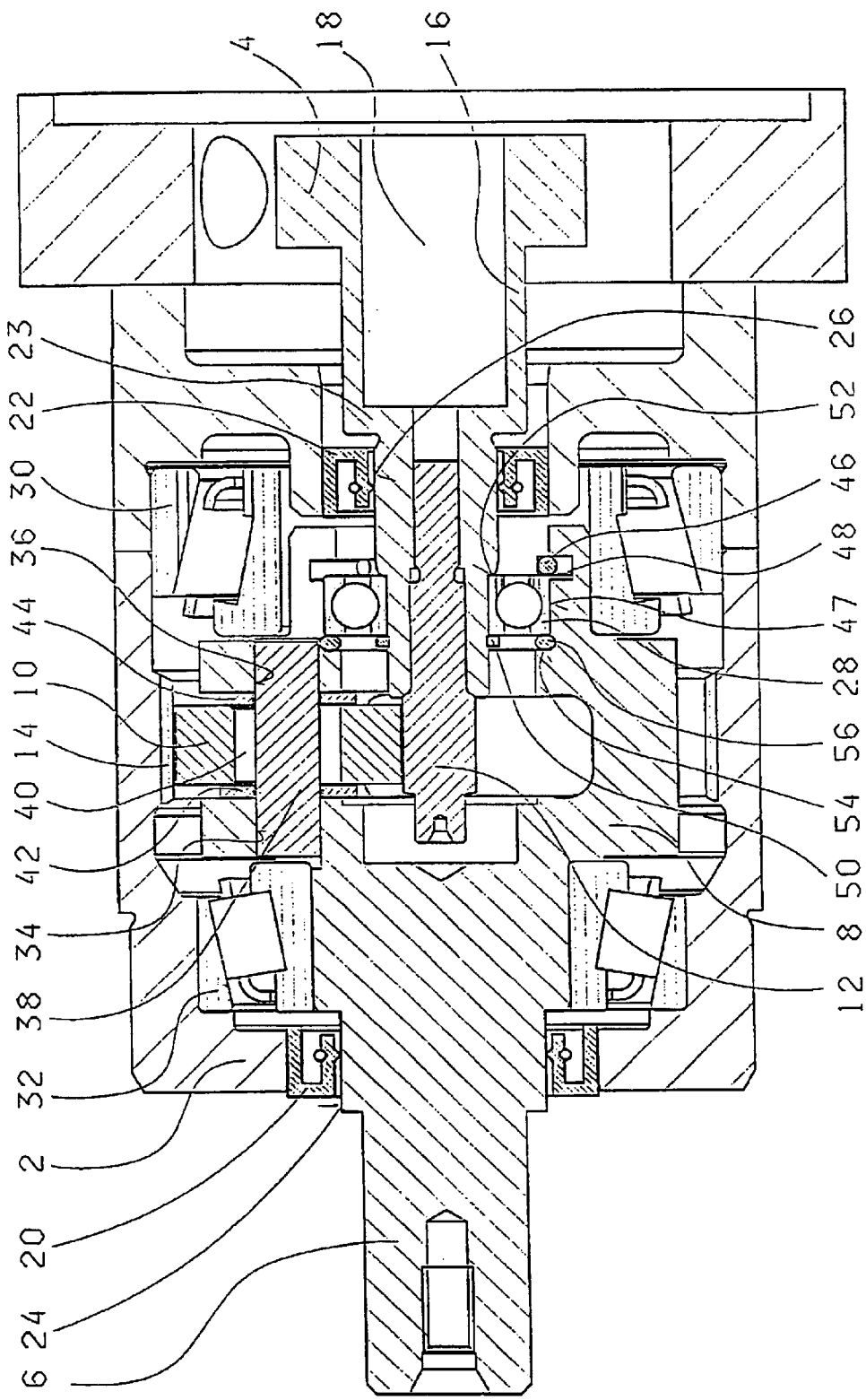

PLANETARY GEAR FOR MOUNTING ON AN ELECTROMOTOR

FIELD OF THE INVENTION

The invention relates to a planetary gear for mounting on an electromotor.

BACKGROUND OF THE INVENTION

Such planetary gears are used for many purposes in automation technology and plant and machinery in general. With such a planetary gear, in which a sun gear can be driven by an output shaft of the electromotor, an annular gear is positioned in the housing and a planetary carrier forms the output, various transmission ratios, typically in the range 4:1 to 10:1, can be produced by varying the geometry of the sun gear and planetary gear wheels and of the planetary carrier.

Owing to the high power density involved, even small internal power losses can give rise to undesired high temperatures. Because of the compactness of the structure, the heat generated by these losses often cannot be dissipated to the desired extent. High temperatures affect service life adversely. A large part of the power loss is attributable to the seals and bearings of the rapidly rotating sun gear shaft on the input side.

A gear of this type is disclosed for example in DE 198 08 184 C1. To receive an output shaft of the electromotor, the sun gear shaft of this known planetary gear is made hollow in a receiving area of enlarged diameter. The sun gear shaft is sealed with respect to the housing by a radial sealing ring.

SUMMARY OF THE INVENTION

The purpose of the present invention is to develop further a planetary gear of the type described so as to minimise the power loss. Furthermore, the planetary gear should be of compact structure and economical to manufacture.

Thus, in accordance with the invention the sealing element that seals the sun gear shaft on the outside with respect to the housing is arranged axially

BRIEF DESCRIPTION OF THE DRAWING

The invention will now be described by way of example, with reference to the accompanying drawings in which:

FIG. 1 shows a longitudinal section through a planetary gear according to the invention.

DETAILED DESCRIPTION OF THE INVENTION

In the single FIGURE attached, the housing is indexed as 2, the sun gear shaft on the input side as 4 and the output shaft of a planetary gear according to the invention as 6. The output shaft 6 rotates with a planetary carrier 8, on which several uniformly distributed planetary gear wheels 10 are mounted and able to rotate. The planetary gear wheels 10 are in simultaneous gear-tooth engagement with a central sun gear 12 that can be driven by the sun gear shaft 4 and with an annular gear 14 fixed in the housing 2.

To receive an output shaft (not shown) of an electromotor, the sun gear shaft 4 has a hollow receiving area 16 that extends axially over the length of a cylindrical bore 18 in the sun gear shaft 4. The inside space of the housing 2 is filled with lubricant and sealed with respect to the outside by two sealing elements formed as radial sealing rings 20, 22. The radial sealing rings are fixed in the housing 2 and are associated with cylindrical functional surfaces 24, 26 of the output shaft and the sun gear shaft respectively. Sliding friction takes place between the radial sealing rings and the said functional surfaces.

According to the invention, the radial sealing ring 22 arranged between the housing 2 and the sun gear shaft 4 is positioned outside the receiving area 16 for the output shaft of the electromotor in an axial section of the sun gear shaft whose outer diameter is smaller compared with that of the receiving area. Only very small frictional losses occur on the functional surface 26, whose diameter is smaller than the diameter of the bore 18, so that higher efficiency is attained and problems due to high temperatures are avoided. Between the receiving area 16 and the location of the radial sealing ring 22 the sun gear shaft has a diameter step 23.

The inner ring of the bearing 28 for the sun gear shaft 4 is also arranged outside the receiving area 16 for the output shaft of the electromotor in an area with reduced outer diameter, so that a bearing of smaller size can be used.

The diameter of the bearing holder on the sun gear shaft is also smaller than the diameter of the bore 18.

The outer bearing ring of the bearing 28 is located in the planetary carrier 8, radially inside the inner ring of a planetary carrier bearing 30. The bearing 28 is positioned axially within the structural space occupied by the planetary carrier bearing 30, and this makes it possible for the axial length of the planetary gear to be short. For the planetary carrier 8 a second bearing 32 is provided which, like the bearing 30, is in the form of a conical-roller bearing and which forms an X arrangement together with the latter.

In the axial space between the conical-roller bearings 30, 32 the planetary carrier 8 has on the two sides of each planetary gear wheel 10 bores 34, 36 that extend through the carrier. These bores 34, 36 each accommodate a planetary bearing pin 38, on which the planetary gear wheel 10 is mounted by means of cylindrical rollers 40 and can rotate. The end surface of the planetary bearing pin 38 abuts against the inner ring of the planetary carrier bearing 32, 34, so that it is advantageously secured against axial displacement without further measures. On each side of each planetary gear wheel 10 thrust washers in the form of annular discs are arranged on the planetary bearing pin 38, and these restrict the axial movement of the planetary gear 10.

The bearing 28 for the sun gear shaft 4 is secured in the planetary carrier 8 against axial displacement in one direction by a circlip 46. To fit the bearing 28, the circlip 46 can be pressed completely into an annular groove 48 in the planetary carrier, which is axially adjacent to the functional surface 47 that receives the outer ring of the bearing. As soon as the outer ring of the bearing 28 has been pushed past the area of the annular groove 48 during assembly, the circlip 46 snaps together and so secures the outer ring of the bearing against axial displacement.

What is claimed is:

1. A planetary gear for mounting on an electromotor, the planetary gear comprising:

planetary gear wheels (10) supported by a rotating planetary carrier (8) that forms an output of the planetary gear and the planetary gear wheels are in constant engagement with a sun gear (12) and an annular gear (14) positioned in a housing (2), the sun gear (12) being connected to a rotatable sun gear shaft (4), the sun gear shaft (4) having a hollow receiving section (16) for directly receiving an output shaft of an electromotor;

a sealing element (22) being provided between the sun gear shaft (4) and the housing (2), wherein the sealing element (22) is spaced axially from the receiving section (16) for the output shaft of the electromotor, and located on a first axial section of the sun gear shaft (4) having a smaller outer diameter than a diameter of the receiving section (16); and a sun gear bearing (28) for the sun gear shaft (4) is located radially inward of an inner ring of a planetary carrier bearing (30), at least partly within a space occupied by the planetary carrier bearing (30), and axially between an end stop of the receiving section (16) and the planetary gear wheels.

2. The planetary gear according to claim 1, wherein an outer bearing ring of the sun gear bearing (28) for the sun gear shaft (4) is positioned in the planetary carrier (8).

3. The planetary gear according to claim 1, wherein the planetary carrier (8) has through bores (34, 36) on either side of each planetary gear wheel (10) to accommodate a planetary bearing pin (38) on which the planetary gear wheel (10) is mounted for rotation and an end face of the planetary bearing pin (38) is axially secured between opposing inner bearing rings of planetary carrier bearings (30, 32), whereby the planetary bearing pin (38) is secured against axial displacement.

4. The planetary gear according to claim 2, wherein an annular groove (48) is provided in the planetary carrier (8) to receive a circlip (46), which is axially adjacent to a functional surface (47) that receives the outer bearing ring of the sun gear bearing (28) for the sun gear shaft, and the outer bearing ring is secured against axial displacement in one direction by the circlip (46).

5. The planetary gear according to claim 1, wherein the sun gear bearing (28) and the sealing element (22) both engage with the sun gear shaft (4) and are located radially within the inner ring of the planetary carrier bearing (30) surrounding the sun gear shaft (4).

6. A planetary gear for mounting on an electromotor, the planetary gear comprising:

planetary gear wheels (10) supported by a rotating planetary carrier (8) that forms an output of the planetary gear and the planetary gear wheels are in constant engagement with a sun gear (12) and an annular gear (14) positioned in a housing (2), the sun gear (12) being connected to a rotatable sun gear shaft (4), the sun gear shaft (4) having a hollow receiving section (16) for directly receiving an output shaft of an electromotor, the sun gear (12), the annular gear (14) and the planetary gear wheels (10) together define a gearing plane;

a sealing element (22) being provided between the sun gear shaft (4) and the housing (2), wherein the sealing element (22) is axially spaced from the receiving section (16) for the output shaft of the electromotor, and located on a first axial section of the sun gear shaft (4) having a smaller outer diameter than a diameter of the receiving section (16); and wherein the sun gear shaft (4) is mounted so that the sun gear shaft (4) can be axially displaced against the restoring force action of an elastic compensating element (56) and an axial compensating element is positioned axially between a face of an outer bearing ring opposite a circlip (46) and a second functional surface (54) of the planetary carrier (8).

7. The planetary gear according to claim 6, wherein the elastic compensating element is an O-ring (56).

8. The planetary gear according to claim 6, wherein a sun gear bearing (28), facilitating rotation of the sun gear shaft (4), and the sealing element (22) both engage with the sun gear shaft (4) and are located radially within an inner ring of a first planetary carrier bearing (30) surrounding the sun gear shaft (4).

9. A planetary gear for mounting on an electromotor, the planetary gear comprising:

a plurality of planetary gear wheels (10) supported by a rotating planetary carrier (8) which forms an output of the planetary gear, the plurality of planetary gear wheels (10) being in constant engagement with a sun gear (12) and an annular gear (14) which is supported by a housing;

the sun gear (12) being connected to a rotatable sun gear shaft (4), the sun gear shaft (4) having a hollow receiving section (16) for directly receiving an output shaft of an electromotor; and a sealing element (22) being provided between the sun gear shaft (4) and the housing (2), wherein a sun gear bearing (28), for the sun gear shaft (4), and the sealing element (22) are both located axially adjacent one another between an end stop of the receiving section (16) and the plurality of planetary gear wheels (10), and the sun gear bearing (28) and the sealing element (22) both engage with the sun gear shaft (4) and are located radially within an inner ring of a first planetary carrier bearing (30) surrounding the sun gear shaft (4).

10. The planetary gear according to claim 9, wherein an outer bearing ring of the sun gear bearing (28) engages with the planetary carrier (8) and an inner bearing ring of the sun gear bearing (28) engages with the sun gear shaft (4).

11. The planetary gear according to claim 9, wherein the planetary carrier (8) has a plurality of pairs of axially aligned through bores (34 and 36), each pair of axially aligned through bores (34 and 36) accommodates a planetary bearing pin (38) on which one of the plurality of planetary gear wheels (10) is rotatably supported, and opposed end faces of each of the planetary bearing pin (38) are axially secured between opposing inner bearing rings of the first planetary carrier bearing (30) and a second planetary carrier bearing (32) such that each planetary bearing pin (38) is prevented from being axial displaced.

12. The planetary gear according to claim 10, wherein an annular groove (48) is provided in the planetary carrier (8) which receives a circlip (46) located axially adjacent a functional surface (47) that supports the outer bearing ring of the sun gear bearing (28), and the circlip (46) prevents the outer bearing ring from being axially displaced in one direction.

* * * * *